(12) United States Patent
Yamada et al.

(10) Patent No.: US 6,757,232 B2
(45) Date of Patent: Jun. 29, 2004

(54) METHOD OF RECORDING AND REPRODUCING INFORMATION AND APPARATUS FOR RECORDING AND REPRODUCING INFORMATION USING THE METHOD

(75) Inventors: Katsuyuki Yamada, Shizuoka (JP); Yuki Nakamura, Kanagawa (JP); Masaki Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 621 days.

(21) Appl. No.: 09/779,000

(22) Filed: Feb. 7, 2001

(65) Prior Publication Data

US 2001/0017833 A1 Aug. 30, 2001

(30) Foreign Application Priority Data

Feb. 8, 2000 (JP) ........................................ 2000-030745

(51) Int. Cl.$^7$ ................................................ G11B 7/00
(52) U.S. Cl. ..................................... 369/59.12; 369/116
(58) Field of Search .......................... 369/59.11, 59.12, 369/116, 100, 275.1, 275.2, 288, 47.41, 47.43, 47.46; 428/64.1, 64.2, 64.3, 64.4, 64.5, 64.6, 64.7, 64.8, 65.1

(56) References Cited

U.S. PATENT DOCUMENTS 5,412,626 A  *  5/1995  Ohno et al. .................. 369/100
5,732,062 A  *  3/1998  Yokoi et al. ................. 369/116
5,740,149 A  *  4/1998  Iwasaki et al. .............. 369/116
5,761,179 A  *  6/1998  Iwasaki et al. ........... 369/59.11
5,790,505 A  *  8/1998  Abe et al. .................... 369/116
5,974,025 A  *  10/1999 Yamada et al. .............. 369/288
6,188,656 B1 *  2/2001  Shoji et al. ............... 369/59.12
6,236,635 B1 *  5/2001  Miyamoto et al. .......... 369/116
6,280,810 B1 *  8/2001  Nakamura et al. .......... 369/288
6,438,085 B1 *  8/2002  Kato et al. ................ 369/59.12
6,459,666 B1 * 10/2002  Yokoi ....................... 369/59.12

* cited by examiner

Primary Examiner—Thang V. Tran
(74) Attorney, Agent, or Firm—Cooper & Dunham LLP (57) ABSTRACT

A method of recording and reproducing information in a phase-change optical recording medium by irradiation of an electromagnetic wave for recording, reproducing and/or rewriting information is proposed, wherein when information is recorded in the phase-change optical recording medium by modulating an input signal and conducting pulse width modulation recording, a recording pulse string for recording and rewriting is a continuous electromagnetic wave, and a recording pulse string for input signal, is an electromagnetic wave pulse string having a front-pulse portion fp, a multi-pulse portion mp with a total pulse duration period T and a duty ratio y, and an off-pulse portion op, wherein the duty ratio y is decreased as a recording linear velocity for the phase-change optical recording medium is increased, whereby multi-speed recording or CAV (constant angular velocity) recording is carried out. An information recording and reproducing apparatus, using the above method, is also proposed.

20 Claims, 5 Drawing Sheets

FIG. 1

(a) INPUT SIGNAL (b) $n' = 1$ (c) $n' = 2$

(a) RECORDING LINEAR VELOCITY:
4.8 m/s (AT LOW RECORDING LINEAR VELOCITY)

(b) RECORDING LINEAR VELOCITY:
9.6 m/s (AT APPROPRIATE RECORDING LINEAR VELOCITY)

(c) RECORDING LINEAR VELOCITY:
12.0 m/s (AT HIGH RECORDING LINEAR VELOCITY)

(a) RECORDING LINEAR VELOCITY: 9.6 m/s (b) RECORDING LINEAR VELOCITY: 19.2 m/s (c) RECORDING LINEAR VELOCITY: 24.0 m/s

METHOD OF RECORDING AND REPRODUCING INFORMATION AND APPARATUS FOR RECORDING AND REPRODUCING INFORMATION USING THE METHOD

BACKGROUND OF THE INVENTION

Field of the Invention

The present invention relates to a method of recording information in a phase-change optical recording medium, reproducing information therefrom, and rewriting information recorded in the phase-change optical recording medium.

The present invention also relates to an apparatus which is (capable of recording information in a phase-change optical recording medium, reproducing information therefrom, and rewriting information recorded in the phase-change optical recording medium by use of the above-mentioned method.

DISCUSSION OF BACKGROUND

For improving the quality of recording signals in the phase-change recording, various recording compensation methods have been disclosed.

For example, Japanese Laid-Open Patent Application 63-266632 discloses, as an effective method for improving the quality of recording signals, a method of recording long amorphous marks by use of a pulse string in a PWM (pulse width modulation) recording, using a recording film having a high crystallization speed.

In Japanese Laid-Open Patent Application 63-266633 and U.S. Pat. No. 5,0150,351, a laser energy level of a pulse string is increased at a leading edge and a trailing edge of the pulse string, or the duration of irradiation is lengthened, whereby the jitters of the mark edge positions are controlled and the quality of recording signals is improved.

Furthermore, as disclosed in Japanese Patent Publication 63-29336, there is known a method of recording information signals in an optical disk by use of an optical disk recording apparatus by having a light spot of a laser team scan the optical disk as the optical disk is irradiated with the laser beam, and by subjecting the light spot of the laser beam to power modulation There is also known a method for appropriately adjusting and setting the recording conditions such as light power for recording and the width of recording light pulse by reproducing information signals recorded in the optical disk, and monitoring the amplitude of the reproduced signal and the length of recording marks.

Figure 1:
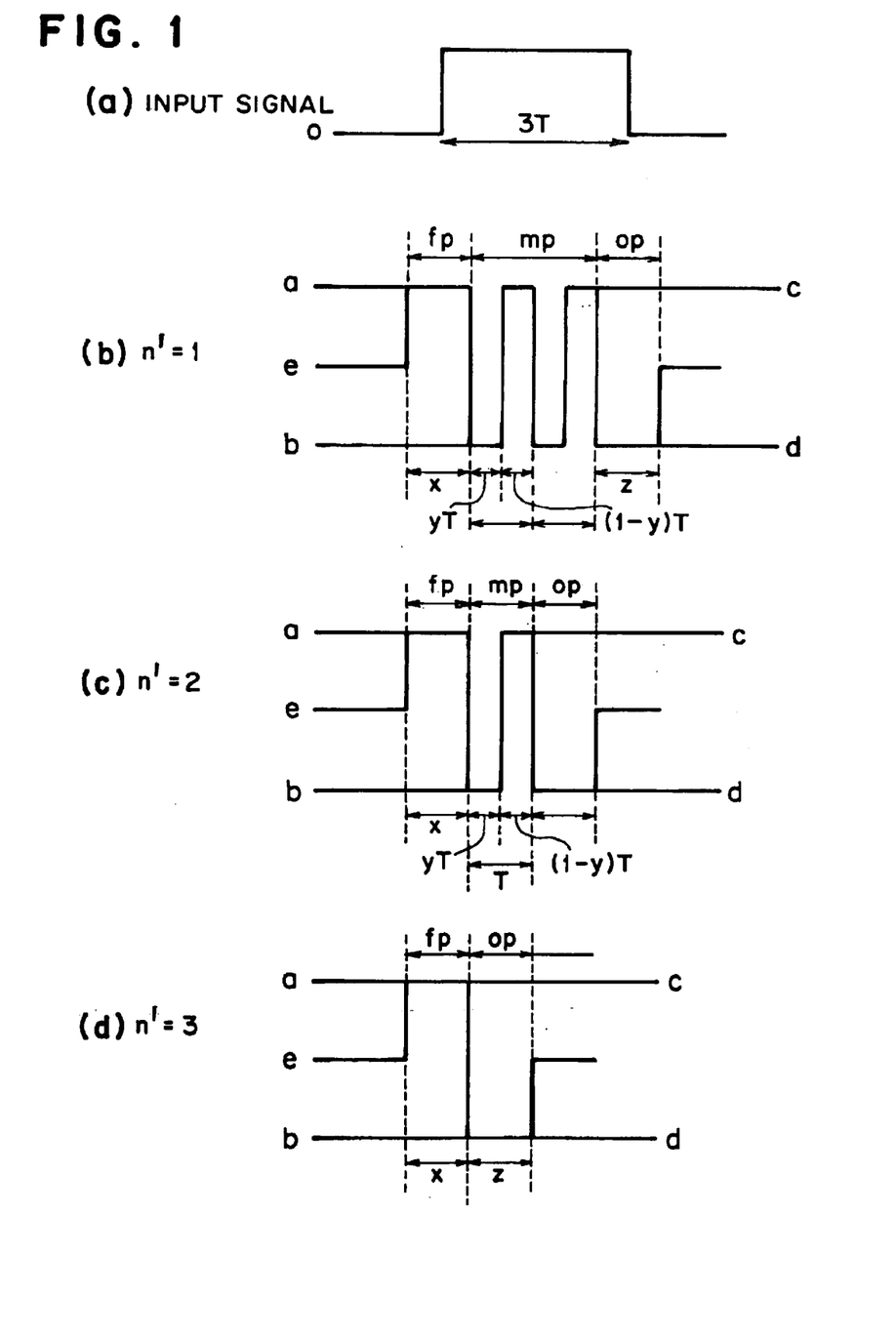
FIG. 1 shows schematic waveform diagrams of pulse waveforms of a recording pulse string, using a 3T signal with n'=1 to 3, employed in an example of the present invention.

Furthermore, Japanese Laid-Open Patent Applications 9-138946, 9-138941, and 9-219021 disclose, as a method of improving the quality of recording signals, a method of recording and reproducing information in an information recording medium as shown in FIG. 1, wherein when information is recorded in the information recording medium by modulating an input signal and conducting pulse width modulation recording, (A) a recording pulse string for recording and rewriting, corresponding to a zero (0) signal with a signal width nT, in which n is a positive integer, and T is a clock unit time, after the modulation of the input signal, is a continuous electromagnetic wave with a power level e, and (B) a recording pulse string for recording and rewriting, corresponding to a one (1) signal with a signal width nT, in which n is a positive integer, and T is a clock unit time, after the modulation of the input signal, is an electromagnetic wave pulse string having:

a front-pulse portion tp with a power level a and a pulse duration period x, a multi-pulse portion mp comprising a low-level pulse with a power level b and a high-level pulse with a power level c, with a total pulse duration period T and a duty ratio y, alternately repeating (n–n') times continuously, and an off-pulse portion op with a power level d and a pulse duration period z, in which x, y and z respectively satisfy $0.5 \leq x \leq 2.0T$, $0.125 \leq y \leq 0.0875$, and $0.125T \leq z \leq 1.0T$, n' is a positive integer which satisfies the condition of $n' \leq n$, and (a and c) $\geq$ e $\geq$ (b and d)

These prior art references also disclose an apparatus for recording and reproducing information in an information recording medium by use of the above-mentioned method The above-mentioned method, however, is not always suitable for improving the quality of recording signals in phase change recording when multi-speed recording or CAV (constant angular velocity) recording is carried out.

Recently, in a rewritable information recording medium, in particular, in the phase-change optical recording medium, there is a keen demand for a technology that makes it possible to record information at a plurality of different linear velocities in one information recording medium. Furthermore, high speed recording is in demand. As a matter of course, the CAV recording which is advantageous to the attainment of high speed recording is also in demand.

However, the technologies described in the above-mentioned prior art references, Japanese laid-Open Patent Applications 9-138946, 9-130947, and 9-219021, cannot meet the above mentioned demands. Specifically, for example, a recording strategy having fp, mp and op, which is capable of recording at a 4× CD linear speed, cannot obtain sufficiently high signal quality at an 8× speed recording and at a 10× speed recording when multiple recording is conducted at the 8× speed recording and the 10× speed recording.

SUMMARY OF THE INVENTION it is therefore a first object of the present invention to provide a method of recording and reproducing information for carrying out multi-speed recording and/or CAV (constant angular velocity) recording, which is capable of obtaining high signal quality, and attaining the improvement on the stability, reliability, and general-use properties.

A second object of the present invention is to provide an information recording and reproducing apparatus which is capable of conducting the above-mentioned method.

The first object of the present invention can be achieved by a method of recording and reproducing information in a phase-change optical recording medium comprising a recording layer which comprises a phase-changeable recording material capable of being subjected to a phase-change by irradiation of an electromagnetic wave for recording, reproducing and/or rewriting information, wherein when information is recorded in the phase change optical recording medium by modulating an input signal and conducting pulse width modulation recording, (A) A recording pulse string for recording and rewriting, corresponding to a zero (0) signal with a signal width nT, in which n is a positive integer, and T is a clock unit time, after the modulation of the input signal, is a continuous electromagnetic wave with a power level e, and (B) a recording pulse string for recording and rewriting, corresponding to a one (1) signal with a signal width nT, in which n is a positive integer, and T is a clock unit time, after the modulation of the input signal, is an electromagnetic wave pulse string having:
- a front-pulse portion tp with a power level a and a pulse duration period x,
- a multi-pulse portion mp comprising a low-level pulse with a power level b and a high-level pulse with a power level c, with a total pulse duration period T and a duty ratio y, alternately repeating (n–n') times continuously, and
- an off-pulse portion mp with a power level d and a pulse duration period z, in which x, y and z respectively satisfy $0.5T \leq x \leq 2.0T$, $0.125 \leq y \leq 0.875$, and $0.125T \leq z \leq 1.0T$, n' is a positive integer which satisfies the condition of $n' \leq n$, and (a and c)$\geq$e$\geq$(b and d), wherein the duty ratio y is decreased as a recording linear velocity for the phase-change optical recording medium is increased, whereby multi-speed recording or CAV (constant angular velocity) recording is carried out.

In the above-mentioned method, by decreasing the duty ratio y as a recording linear velocity for the phase-change optical recording medium is increased, recording energy is replenished during high speed recording, which facilitates the multi speed recording and the CAV (constant angular velocity) recording.

In the above-mentioned method, it is preferable that the recording linear velocity, when the duty ratio y is 0.5, be set in a range of more than $(v_H+V_L)/2$ to $V_H$ or less, that is, $(V_H+V_L)/2 <$ the recording linear velocity (when y=0.5) $\leq V_H$, wherein $V_H$ is a maximum recordable linear velocity and $V_L$ is a minimum recordable linear velocity, whereby recording signals with improved drive-media matching performance can be obtained.

The second object of the present invention can be achieved by an information recording and reproducing apparatus for recording and reproducing information by use of the above-mentioned method of recording and reproducing information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Generally, when the multi-speed recording and the CAV recording are conducted, at a low recording linear velocity the recording power applied tends to become excessive, while at a high recording linear velocity the recording power applied tends to become insufficient.

Therefore, it is important that the recording power to be applied and the recording linear velocity to be set are well-balanced. In order to achieve this, generally, such balancing is conducted that as the linear recording velocity is increased, the recording power is increased as conducted, for example, in CD-R (recordable).

The inventors of the present invention have discovered that the recording power and the linear recording velocity can be effectively balanced by increasing or decreasing the duty ratio y in the mp portion in FIG. 1 in accordance with the recording linear velocity. The present invention is based on this discovery.

The phase-change optical recording medium for use in the present invention comprises a recording layer comprising a phase-changeable recording material capable of being subjected to a phase-change by irradiation of an electromagnetic wave for recording, reproducing and/or rewriting information.

As the phase-changeable recording material for use in the present invention, there can be employed a phase-changeable recording material comprising at least Sb and Te.

As the phase-changeable recording material for use in the present invention, it is preferable to use a phase-changeable recording material comprises (Ge and/or Ag), In, Sb and Te.

As the phase-changeable recording material for use in the present invention, it is also preferable to use a phase changeable recording material comprising (Ge and/or Ag), (In and/or Ca), Sb and Te.

In the above-mentioned phase-changeable recording material, it is preferable that the respective composition ratios of (Ge and/or Ag), (In and/or Ga), Sb and Te in terms of atomic % thereof, $\alpha$, $\beta$, $\gamma$ and $\delta$, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$, and
$0.22 \leq \delta/(\alpha+\beta+\gamma+\delta) \leq 0.32$.

In the above-mentioned phase-changeable recording material, it is also preferable that the respective composition ratios of (Ge and/or Ag), (In and/or Ga), Sb and Te in terms of atomic % thereof, $\alpha$, $\beta$, $\gamma$ and $\delta$, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$,
$0.22 \leq \delta/(\alpha+\beta+\gamma+\delta) \leq 0.32$, and
$0.88 \leq (\gamma+\delta)/(\alpha+\beta+\gamma+\delta) \leq 0.97$.

In the above-mentioned phase-changeable recording material, it is also preferable that the respective composition ratios of (Ge and/or Ag), (In and/or Ga), Sb and Te in terms of atomic % thereof, $\alpha$, $\beta$, $\gamma$ and $\delta$, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$,
$0.22 \leq \delta/(\alpha+\beta+\gamma+\delta) \leq 0.32$,
$0.88 \leq (\gamma+\delta)/(\alpha+\beta+\gamma+\delta) \leq 0.97$, and
$\alpha < \beta$.

In the above-mentioned phase-changeable recording material, it is also preferable that the respective composition ratios of (Ge and/or Ag), (In and/or Ga), Sb and Te in terms of atomic % thereof, α, β, γ and δ, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$,
$0.22 \leq \delta/(\alpha+\beta+\gamma+\delta) \leq 0.32$,
$0.88 \leq (\gamma+\delta)/(\alpha+\beta+\gamma+\delta) \leq 0.97$ and
$\alpha < \beta$, and that the phase-changeable recording material further comprise a GeTe crystal.

In the above-mentioned phase-changeable recording material, it is also preferable that the respective composition ratios of (Ge and/or Ag), (In and/or Ga), Sb and Te in terms of atomic % thereof, α, β, γ and δ, satisfy the conditions of:

$0 < \alpha \leq 10$,
$2 \leq \beta \leq 12$,
$55 \leq \gamma \leq 70$,
$22 \leq \delta \leq =$, and
$\alpha + \beta + \gamma + \delta = 100$.

In the present invention, a phase-changeable recording material comprising Ag, In, Sb and Te is particularly preferable for use in the present invention. This is because a recording layer comprising this phase-changeable recording material has such thermal properties that are suitable for recording pulse waves used in the recording and reproducing method of the present invention.

Figure 2:
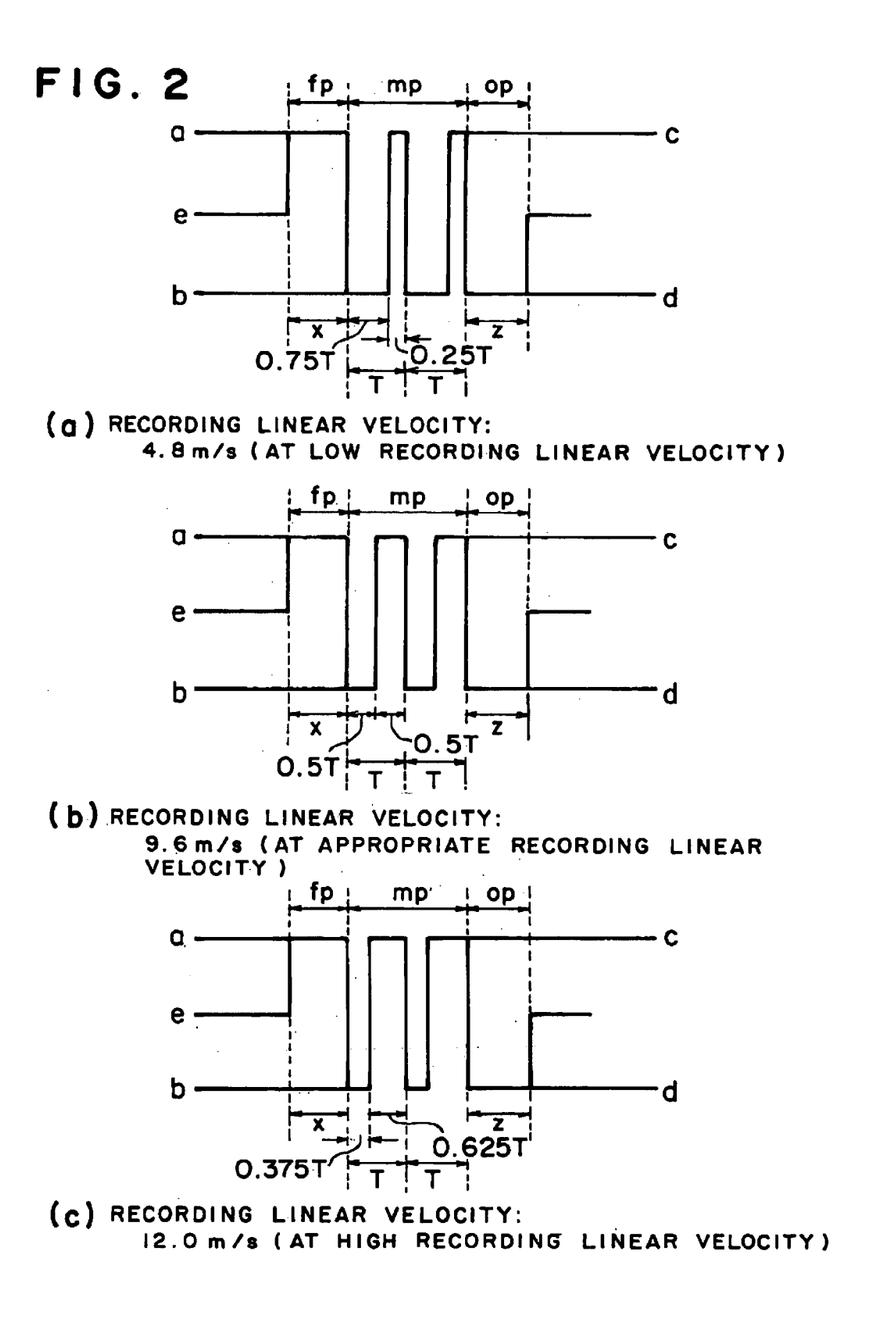
FIG. 2 shows recording waveform in multi-speed recording of 4x–10x conducted using a CD-RW, which is an example of a phase-change optical recording medium for use in the present invention.

FIG. 2 shows the recording waves of a CD-RW (rewritable) at a multi-speed recording of 4×–10×, which is an example of the present invention. This example also corresponds to a CAV recording with an inner peripheral recording linear velocity of 4.8 m/s and an outer peripheral recording linear velocity of 12.0 m/s.

In this example, at recording linear velocities of 4.8 m/s, 9.6 m/s, and 12.0 m/s, the respective duty ratios of an mp portion are decreased to 0.75, 0.5, and 0.375 as the recording linear velocity is increased.

At a low recording linear velocity of 4.8 m/s, an excessive thermal damage is reduced by decreasing the recording pulse width in the mp portion, and a cooling period in the mp portion is lengthened, whereby a mark with minimum jitters in the edges thereof can be recorded.

In contrast, at a high recording linear velocity of 12.0 m/s, a sufficient amount of energy is applied to the recording layer to cause a phase change in the recording layer by increasing the recording pulse width in the mp portion, so that even though the cooling period in the mp portion is shortened due to the high recording linear velocity, rapid cooling of the recording layer can be properly performed, whereby a mark with minimum jitters in the edges thereof can be recorded.

In the phase-change optical recording medium in which the fusing and rapid cooling of the recording layer takes place, it is advantageous for overwriting and also in view of various signal qualities to be obtained that the duty ratio of mp of the recording pulse is near 0.5 since fusing and the rapid cooling of the recording layer can be carried out in a well-balanced manner at the duty ratio. Therefore, it is an important matter at what recording linear velocity the duty ratio of 0.5 for mp should be set in the multi speed recording when the matching of the drive media is taken into consideration.

The inventors of the present invention have discovered that it is advantageous that the recording linear velocity at which the duty ratio of mp is 0.5 is set so as to be greater than (maximum recordable linear velocity $V_H$+minimum recordable linear velocity $V_L$)/2 to maximum recordable linear velocity $V_H$ or less, that is, $(V_H+V_L)/2 <$ the recording linear velocity (when y=0.5)=$V_H$.

In the drive which is capable of performing multi-speed recording, the maximum recordable linear velocity in often used. In the CAV recording, the maximum linear recording is carried out at the outer peripheral portion which is susceptible to the mechanical characteristics thereof. Therefore, even in the CAV recording, the signal quality at the high speed recording is important. For the above-mentioned reasons, the inventors of the present invention have discovered that in order to carry out highly reliable recording in practice, it is advantageous to set a recording pulse wave form with a duty ratio of 0.5 in mp, which is highly reliable, on the high speed recording side, and the present invention has been made based on this discovery.

It is preferable that the recording linear velocity at which the duty ration of mp is 0.5 be greater than 0.55×(maximum recordable linear velocity $V_H$+minimum recordable linear velocity $V_L$) to maximum recordable linear velocity $V_H$ or leas, that is, $0.55 \times (V_H+V_L) <$ the recording linear velocity (when y=0.5) $\leq V_H$.

Figure 3:
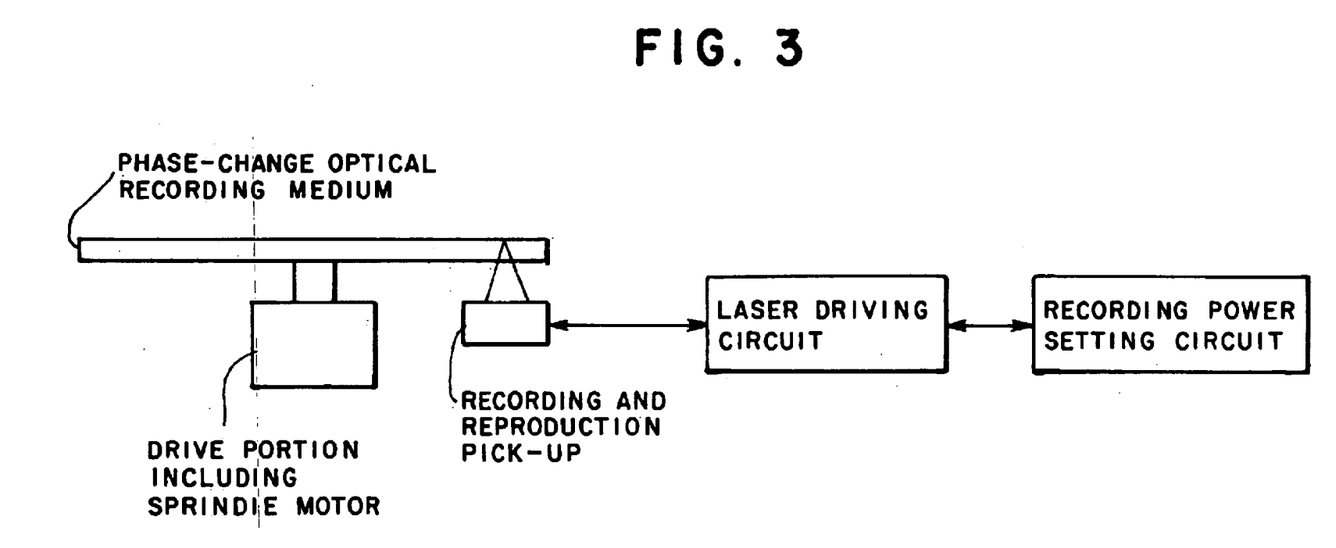
FIG. 3 shows a block diagram of an example of a recording and reproduction apparatus of the present invention.

FIG. 3 schematically shows a diagram of an example of a phase-change optical recording and reproduction apparatus using the above-mentioned information recording method. As shown in FIG. 3, in the phase-change optical recording and reproduction apparatus, the phase-change optical recording medium is driven in rotation by drive means comprising a spindle motor. A light source comprising a semiconductor laser is activated by a laser driving circuit which serves as light source driving means in a recording and reproduction pick-up, and the laser light serving as electromagnetic wave, with the duty ratio of mp having increased and decreased at the recording linear velocity as shown in FIG. 2, is applied to the phase-change optical recording medium by the semiconductor laser through an optical system (not shown), whereby the phase of the recording layer of the phase-change optical recording medium is changed. The light reflected by the phase-change optical recording medium subjected to the phase change is received by the recording and reproduction pick-up, whereby information is recorded in or reproduced from the phase-change optical recording medium. An appropriate recording power for the recording and reproduction pick-up is set by a recording power setting circuit serving as recording power setting means as shown in FIG. 3.

The recording and reproduction apparatus for the phase-change optical recording medium is capable of causing phase changes in the recording layer of the phase-change optical recording medium by irradiating the recording medium with laser light, thereby recording information from the recording medium.

The recording and reproduction apparatus is also capable of rewriting information recorded in the phase-change optical recording medium, and is provided with recording means which performs modulation of signals to be recorded in a modulation portion thereof, and records information in the phase-change optical recording medium by the recording and reproduction pick up included in the recording means The recording means including the pick-up performs the so-called PWM (pulse width modulation) by recording marks in the recording layer of the phase-change optical recording medium so as to record signals in the width of the marks.

The recording means modulates signals to be recorded, using clock signals, in the modulation portion by Eight-to Fourteen to Fourteen Modulation (EFM) or an improved EFM, which is suitable for recording the information of rewritable compact disks.

The recording means conduct the PWM (pulse width modulation) recording in the following manner:

In conducting the PWM recording, a recording pulse string for recording and rewriting, corresponding to a zero (0) signal with a signal width nT, in which n is a positive integer, and T is a clock unit time, after the modulation of the signal, is a continuous electromagnetic wave or a continuous light, with a power level e, and a recording pulse string for recording and rewriting, corresponding to a one (1) signal with a signal width nT, in which n is a positive integer, and T is a clock unit time, after the modulation of the signal, is an electromagnetic wave pulse string or a recording light pulse string having:

a front-pulse portion mp with a power level a and a pulse duration period x, a multi-pulse portion mp comprising a low-level pulse with a power level b and a high-level pulse with a power level c, with a total pulse duration period T and a duty ratio y, alternately repeating (n–n') times continuously, and an off-pulse portion op with a power level d and a pulse duration period z, in which x, y and z respectively satisfy $0.5T \leq x \leq 2.0T$, $0.125 \leq y \leq 0.875$, and $0.125T \leq z \leq 1.0T$, n' is a positive integer which satisfies the condition of $n' \leq n$, and (a and c) $\geq$ e $\geq$ (b and d), wherein the duty ratio y is decreased as a recording linear velocity for the phase-change optical recording medium is increased, whereby multi-speed recording or CAV (constant angular velocity) recording is carried out.

In FIG. 2, (b) is the case where n'=1, (c) is the case where n'=2 and (d) is the case where n'=3.

Figure 4:
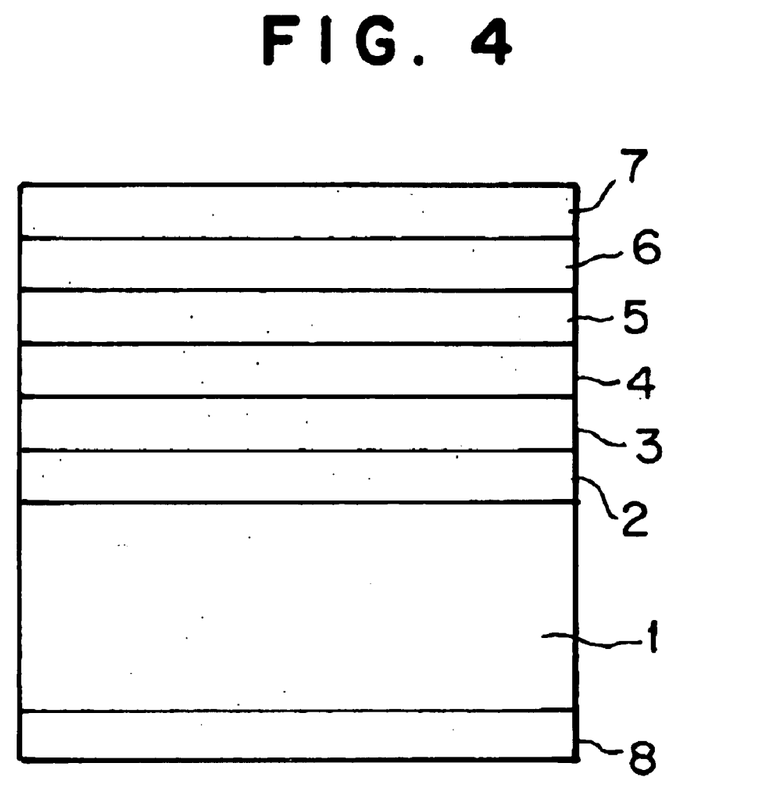
FIG. 4 shows a schematic cross-sectional view of an example of a phase-change optical recording medium for use in the present invention.

A basic layer structure of an example of the phase-change optical recording medium for use in the present invention is as shown in FIG. 4. Namely, the phase-change optical recording medium comprises a substrate 1 having guide grooves (not shown), a first dielectric layer 2, a recording layer 3, a second dielectric layer 4, a metal or alloy layer 5, and an overcoat layer 6 which are successively overlaid as shown in FIG. 4. It is preferable that a printed layer 7 be provided on the overcoat layer 6, and that a hard coat layer 8 also be provided on a mirror plane of the substrate 1.

As the material for the substrate 1, glass, ceramics and resin can be usually used. However, a substrate made of a resin is preferable in view of the moldability and the cost thereof. Examples of the resin for the substrate are polycarbonate resin, acrylic resin, epoxy resin, polystyrene resin, acrylonitrile styrene copolymer resin, polyethylene resin, polypropylene resin, silicone resin, fluorine-containing resin, ASS resin and urethane resin. In view of moldability, optical characteristics, and cost, polycarbonate resin and acrylic resin are preferable as the material for the substrate 1. The substrate may be in the shape of a disk, a card, or a sheet.

When a rewritable compact disk (CD-RW) is used as the phase-change optical recording medium of the present invention, it is preferable that the CD-RW be used under the conditions that the guide groove formed in the substrate have a width of 0.25 μm to 0.65 μm, more preferably 0.30 μm to 0.60 μm, and a depth of 150 Å to 550 Å, more preferably 200 Å to 450 Å.

In order to improve the quality of recording signals for the multi-speed recording and the CAV (constant angular velocity) recording, it is preferable to adjust the composition of the phase-changeable recording material for the recording layer.

More specifically, it is preferable that the phase-changeable recording material comprise at least Sb and Te, since when the phase-changeable recording material comprises at least Sb and Te, the method of the present invention is significantly improved with respect to overwrite performance.

Furthermore, it is more preferable that the phase-changeable recording material comprise (Ge and/or Ag), In, Sb and Te, since when the phase-changeable recording material comprises (Ge and/or Ag), In, Sb and Te, a recordable range of overwrite recording linear velocity can be enlarged, namely, a margin for the recording linear velocity can be enlarged. In the CAV recording, there can be provided a recording method for which a phase-change optimal recording medium with a larger diameter can be used.

By the addition of Ge to the recording material, there can be provided a recording method with high recording and reproducing reliability even after the recording medium is preserved at a temperature as high as 80°C.

In the above-mentioned method of the present invention, it is also preferable that the phase-changeable recording material comprise (Ge and/or Ag), (in and/or Ga), SD and Te, since when the phase-changeable recording material comprise (Ge and/or Ag), (In and/or Ga), Sb and Te, the recordable range of overwrite recording linear velocity can be enlarged towards a higher recording velocity side. Furthermore, by adjusting the ratio of (Ce and/or Ag)/(Tn and/or Ga), the range of the recording linear velocity can be controlled as desired, so that there can be provided a recording method suitable for high speed recording.

In the above-mentioned phase-changeable recording material comprising (Ge and/or Ag), (In and/or Ga), Sb and Te, it is also preferable that the respective composition ratios of (Ge and/or Ag), (In and/or Ga), Sb and Te in terms of atomic % thereof, α, β, γ and δ, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$, and
$0.22 \leq \delta/(\alpha+\beta+\gamma+\delta) \leq 0.32$.

This is because when the phase-changeable recording material has the above-mentioned composition, there can be provided a recording method with such signal quality that can be reproduced by a CD drive system such as CD-ROM and by a DVD drive system such as DVD-ROM, being secured, for example, with respect to reflectivity and signal amplitude, in an entire range from a lower limit recording linear velocity through an upper limit recording linear velocity.

Furthermore, when the phase-changeable recording material has the above-mentioned composition, the life of the recording medium for reproducing recording signals at room temperature can be extended to more than 30 years.

In the above-mentioned phase-changeable recording material comprising (Ge and/or Ag), (In and/or Ga), Sb and Te, it is also preferable that the respective composition ratios of (Ge and/or Ag), (In and/or Ga), Sb and Te in terms of atomic % thereof, α, β, γ and δ, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$,
$0.22 \leq \delta/(\alpha+\beta+\gamma+\delta) \leq 0.32$, and
$0.88 \leq (\gamma+\delta)/(\alpha+\beta+\gamma+\delta) \leq 0.97$.

This is because when the phase-changeable recording material has the above-mentioned composition, the reflectivity of the recording media after recording can be increased, and there can be provided a recording method with an increased range of applicable drives for reproduction by a CD drive system such as CD-ROM or by a DVD drive system such as DVD ROM, which recording method is capable of recording signal that can be reproduced at high speed.

In the above-mentioned phase-changeable recording material comprising (Ge and/or Ag), (In and/or Ga), Sb and Te, it is also preferable that the respective composition ratios of (Ge and/or Ag), (In and/or Ca), Sb and Te in terms of atomic % thereof, $\alpha$, $\beta$, $\gamma$, and $\delta$, satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$,
$0.22 \leq \delta/(\alpha+\beta+\gamma+\delta) \leq 0.32$,
$0.88 \leq (\gamma+\delta)/(\alpha+\beta+\gamma+\delta) \leq 0.97$, and
$\alpha < \beta$.

This is because when the phase-changeable recording material has the above-mentioned composition, the quality of recording signals at the upper limit recording velocity in the multi-speed recording and the CAV recording can be improved, so that there can be provided a recording method in which signals recorded at the upper limit recording velocity, which are likely to be used most, are difficult to be affected by various factors such as ambient temperature and humidity, and the cleanness of the recording medium.

In the above-mentioned phase-changeable recording material comprising (Ge and/or Ag), (In and/or Ga), Sb and Te, it is also preferable that the respective composition ratios or (Ge and/or Ag), (In and/or Ga), Sb and Te in terms or atomic % thereof, $\alpha$, $\beta$, $\gamma$ and $\delta$ satisfy the conditions of:

$0.001 \leq \alpha/(\alpha+\beta+\gamma+\delta) \leq 0.10$,
$0.02 \leq \beta/(\alpha+\beta+\gamma+\delta) \leq 0.12$,
$0.55 \leq \gamma/(\alpha+\beta+\gamma+\delta) \leq 0.70$,
$0.22 \leq \delta/(\alpha+\beta+\gamma+\delta) \leq 0.32$,
$0.88 \leq (\gamma+\delta)/(\alpha+\beta+\gamma+\delta) \leq 0.97$ and
$\alpha < \beta$, and the phase-changeable recording material further comprises a GeTe crystal.

This is because when the phase-changeable recording material has the above-mentioned composition and comprises the GeTe crystal, there can be provided a recording method in which signals recorded in an entire range from a lower limit recording linear velocity through an upper limit recording linear velocity in the multi-speed recording and the CAV recording are difficult to be affected by various factors such as ambient temperature and humidity, and the cleanness of the recording medium.

It is also preferable that the phase-changeable recording material comprise Ag, In, Sn and Te with the respective composition ratios thereof in terms of atomic % being $\alpha$, $\beta$, $\gamma$ and $\delta$, and satisfying the conditions of:

$0 < \alpha \leq 10$,
$2 \leq \beta \leq 12$,
$55 \leq \gamma \leq 70$,
$22 \leq \delta \leq =$, and
$\alpha+\beta+\gamma+\delta=100$.

When the phase-changeable recording materials has the above composition, there can be obtained reproduced signals which have excellent stability and sufficient life for use in practice.

More specifically, when Ag, In and Sb are in the above-mentioned respective content ranges, the reproduction stability and the life of signals are improved.

The content of Te has a significant effect on the linear velocity of the recrystallization of the recording layer. In view of the effect of the content of Te, it is preferable that the content or Te be in the range of 22 atomic % to 32 atomic % as mentioned above even though the linear velocity of the recrystallization of the recording layer is controlled by adjusting the thickness of the recording layer or by the thermal conductivity of other layers.

For improvement of the reproduction stability and the life of signals, it is also effective to add to the recording layer at least one element selected from the groups 3B, 4B and 5B in the periodic table. The reduction of the reproduction stability and the life of signals is caused by the crystallization of amorphous marks. The addition of the element selected from the groups 3E, 4B and 5B in the periodic table to the recording layer is effective for controlling the crystallization of amorphous marks. The mechanism to controlling the crystallization of amorphous marks is not clearly known, but it is considered that the element added enters spatial gaps in AgInSbTe or forms a chemical bond in AgInSbTe, whereby the crystallization of amorphous marks is controlled. Therefore, elements with a smaller atomic radius or elements having a large chemical bonding strength with AgInSbTe, and elements having many bondings with AgInSbTe are effective for controlling the crystallization of amorphous marks. In particular, D, C, N, Si and Ge are effective for controlling the crystallization of amorphous marks in AgInSbTe. It is preferable that the amount of these elements added to the recording layer be 5 atomic % or less. When the amount is more than 5 atomic %, the elements added have an effect on the record erasing characteristics of the recording layer so that non-erasing may be caused in the recording layer.

It is preferable that the recording layer have a thickness of 10 nm to 50 nm, more preferably 12 nm to 30 nm. It is furthermore preferable that the recording layer have a thickness of 14 nm to 75 nm when initial characteristics, such as jitters, overwrite characteristics, and production efficiency are taken into consideration. When the thickness of the recording layer is less than 10 nm, the light absorption performance of the recording layer tends to be significantly lowered, while when the thickness of the recording layer is more than 50 nm, uniform phase change is difficult to occur at high speed recording.

The recording layer can be formed by various phase growth methods such as vacuum deposition method, sputtering method, plasma CVD method, optical CVD method, ionic plating method, and electron beam deposition method Of these methods, sputtering method is excellent in view of the mass production performance and the film thickness of the recording layer produced.

As the materials for the first dielectric layer and the second dielectric layer, there can be employed metal oxides such as SiO, $SiO_2$, ZnO, $SnO_2$, $Al_2O_3$, $TiO_2$, $In_2O_3$, MgO, and $ZrO_2$, nitrides such as $Si_3N_4$, AlN, TiN, BN, and ZrN, sulfides such as ZnS, $In_2S_3$, $TaS_4$, carbides such as SiC, TaC, $B_4C$, WC, TiC and ZrC, diamond-like carbon, and mixture of the above.

A protective layer can be made by use of each of the above materials or a mixture of the above materials, impurities may be contained therein when necessary.

The above-mentioned dielectric layers can be constructed in a multi-layered form when necessary.

It is required that the melting points of the first dielectric layer and the second dielectric layer be higher than the melting point of the recording layer.

The first dielectric layer and the second dielectric layer can be formed by various phase growth methods such as vacuum deposition method, sputtering method, plasma CVD method, optical CVD method, ionic plating method, and electron beam deposition method. Of these methods, sputtering method is excellent in view of the mass production performance and the film thickness of the dielectric layers produced.

The thickness of the first dielectric layer has a significant effect on the reflectivity at the reproduction wavelength (650 nm) of DVD. It is required that the first dielectric layer have a thickness of 65 nm to 130 nm in order to satisfy the reflectivity of 0.15 to 0.25 in accordance with the CD-RW disk standards at the reproduction wavelength of 780 nm and 650 nm.

It is preferable that the second dielectric layer have a thickness of 15 nm to 45 nm, more preferably 20 nm to 40 nm. When the thickness of the second dielectric layer is less than 1.5 nm, the second dielectric layer is difficult to perform its function as heat resistant protective layer, and the recording sensitivity of the recording medium is lowered. On the other hand, when the thickness of the second dielectric layer is more than 45 nm, the second dielectric layer tends to be peeked away at the interface thereof from the recording layer, so that the repeating recording performance of the recording medium is lowered.

As the material for the metal or alloy layer, there can be employed metal materials such as Al, Au, Ag, Cu and Ta and alloys thereof. Furthermore, there can be added thereto as additional elements Cr, Ti, Si, Cu, Ag, Pd and Ta. The metal or alloy layer serves as reflective heat dissipation layer, and can be formed by various phase growth methods such as vacuum deposition method, sputtering method, plasma CVD method, optical CVD method, ionic plating method, and electron beam deposition method.

It is preferable that the metal or alloy layer have a thickness of 70 nm to 200 nm, more preferably 100 nm to 160 nm.

It is also preferable that the overcoat layer for preventing oxidation of the metal or alloy layer be provided on the metal or alloy layer. As the material for the overcoat layer, ultraviolet cured resin prepared by spin coating is in general use. It is preferable that the overcoat layer have a thickness of 3 $\mu$m tm 15 $\mu$m. When the thickness of the overcoat layer is less than 3 $\mu$m, there is the case where the occurrence of errors is increased when a printed layer is provided on the overcoat layer. When the thickness of the overcoat layer is more than 15 $\mu$m, the internal stress thereof is so increased that the mechanical characteristics of the disk are largely affected by the increased stress.

A the material for the hard coat layer, ultraviolet cured resin prepared by spin coating is in general use. It is preferable that the hard coat layer have a thickness of 2 $\mu$m to 6 $\mu$m. When the thickness of the hard coat layer is lass than 2 $\mu$m, sufficient anti-scratching properties for use in practice cannot be obtained, while when the thickness of the hard coat layer is more than 6 $\mu$m, the internal stress of the hard coat layer it so increased that the mechanical characteristics of the disk are largely affected by the increased stress.

It is also preferable that the hardness of the hard coat layer be h or more in terms of pencil hardness at which the surface of the hard coat layer is not largely scratched when rubbed with a cloth.

When necessary, an electroconductive material may be added to the hard coat layer, whereby the hard coat layer can be effectively made antistatic to prevent dust from adhering to the hard coat layer.

EXAMPLE

Figure 5:
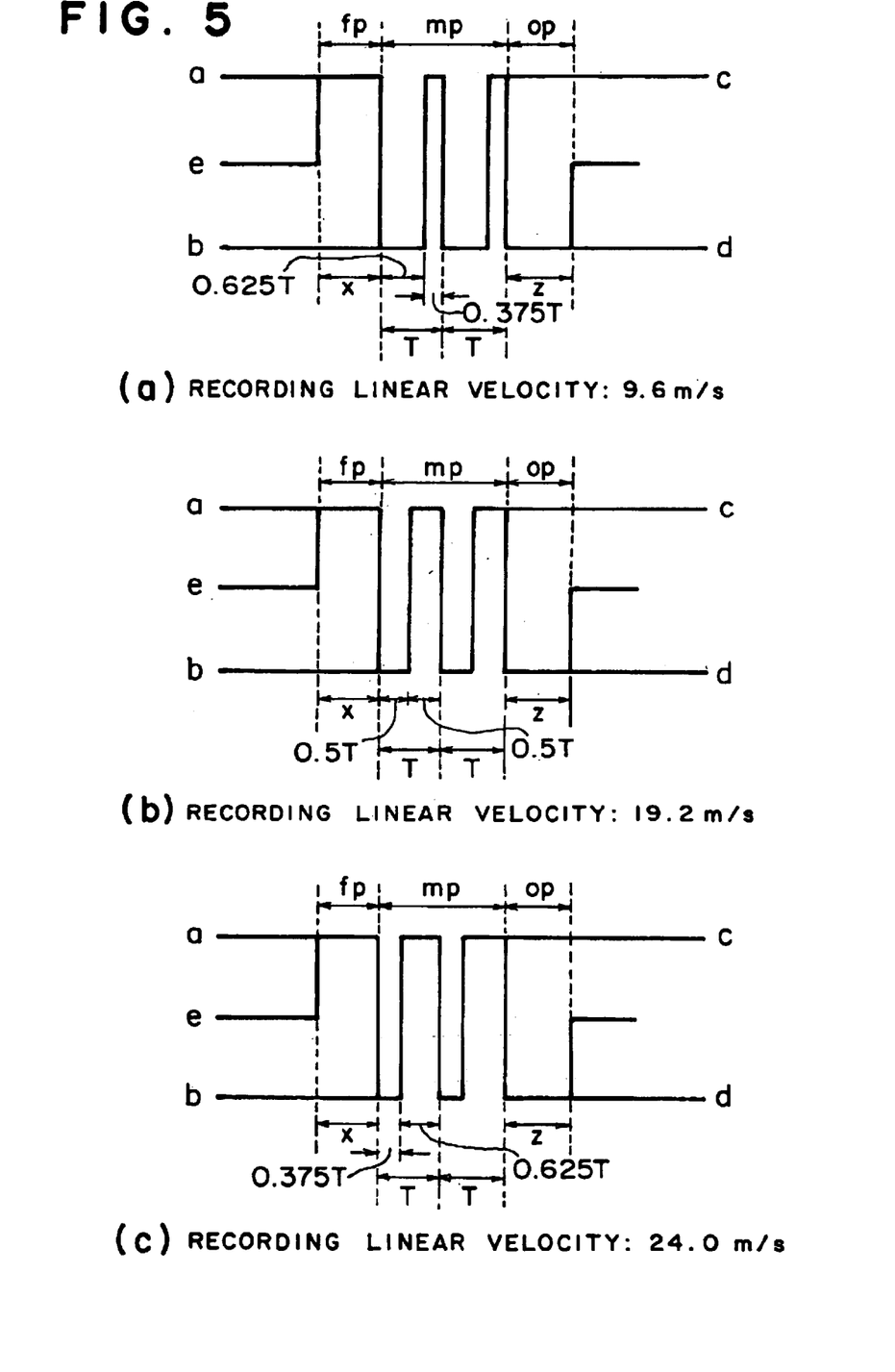
FIG. 5 shows pulse waveforms used in the recording conducted in Example of the present invention.

Recording was conducted to a phase-change optical recording medium with a layer structure of substrate ZnS-SiO$_2$ (90 nm) AgInSbTe (18 nm) ZnSSiO$_2$ (30 nm) Al alloy (140 nm), using the pulse wave as shown in FIG. 5 at the recording linear velocities of 9.6 m/s, 19.2 m/s, and 24.0 m/s.

As the optical recording apparatus for this recording, there was employed an optical recording apparatus equipped with the same circuits and drive portion as shown in FIG. 3, including a pick-up with a wavelength of 780 nm and NA 0.5.

As the recording signals, EFM modulated input signals were used. The signals recorded at the above-mentioned respective recording linear velocities were reproduced at a reproduction velocity or 1.2 m/s. As a result, excellent initial jitters of 22 ns, 20 ns and 23 ns were respectively obtained.

The jitters after conducting overwriting 1000 times at the above-mentioned respective recording linear velocities were respectively 32 ns, 30 ns and 33 ns, which were excellent.

Japanese Patent Application No. 2000-3030745 filed Feb. 8, 2000 is hereby incorporated by reference

What is claimed is:

1. A method of recording and reproducing information in a phase-change optical recording medium comprising a recording layer which comprises a phase-changeable recording material capable of being subjected to a phase-change by irradiation of an electromagnetic wave for recording, reproducing and/or rewriting information, wherein when information is recorded in said phase-change optical recording medium by modulating an input signal and conducting pulse width modulation recording, (A) a recording pulse string for recording and rewriting, corresponding to a zero (0) signal with a signal width nT, in which n is a positive integer, and T is a clock unit time, after the modulation of said input signal, is a continuous electromagnetic wave with a power level e, and (B) a recording pulse string for recording and rewriting, corresponding to a one (1) signal with a signal width nT, in which n is a positive integer, and T is a clock unit time, after the modulation of said input signal, is an electromagnetic wave pulse string having;

a front-pulse portion fp with a power level a and a pulse duration period x, a multi-pulse portion mp comprising a low level pulse with a power level b and a high-level pulse with a power level c, with a total pulse duration period T and a duty ratio y, alternately repeating (n–n') times continuously, and an off-pulse portion op with a power level d and a pulse duration period z, in which x, y and z respectively satisfy $0.5T \leq y \leq 2.0T$, $0.125 \leq y \leq 0.875$, and $0.125T \leq z \leq 1.0T$, n' is a positive integer which satisfies the condition of $n' \leq n$, and (a and c) $\geq e \geq$ (b and d), wherein said duty ratio y is decreased as a recording linear velocity for said phase-change optical recording medium is increased, whereby multi-speed recording or CAV (constant angular velocity) recording is carrier out.

2. The method as claimed in claim 1, wherein said recording linear velocity, when said duty ratio y is 0.5, is set in a range of more than $(V_H+V_L)/2$ to $V_H$ or less, that is, $(V_H+V_L)/2 <$ said recording linear velocity (when y=0.5) $\leq V_H$, wherein $V_H$ is a maximum recordable linear velocity and $V_L$ is a minimum recordable linear velocity.

3. The method as claimed in claim 1, wherein said phase-changeable recording material comprises at least Sb and Te.

4. The method as claimed in claim 1, wherein said phase-changeable recording material comprises (Cc and/or Ag), In, Sb and Te.

5. The method as claimed in claim 1, wherein said phase-changeable recording material comprises (Ge and/or Ag), (In and/or Ga), Sb and Te.

6. The method as claimed in claim 5, wherein when the respective composition ratios of (Ge and/or Ag), (In and/or Ca), Sb and To in terms of atomic % thereof are α, β, γ and δ, α, β, γ and δ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, and $0.22 \leq \delta/(\alpha+\beta+\gamma+\delta) \leq 0.32$.

7. The method as claimed in claim 5, wherein when the respective composition ratio of (Ge and/or Ag), (In and/or Ga), Sb and Te in terms of atomic % thereof are α, β, γ and δ, α, β, γ and δ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, $0.22 \leq \delta/(\alpha+\beta+\gamma+\delta) \leq 0.32$, and $0.88 \leq (\gamma+\delta)/(\alpha+\beta+\gamma+\delta) \leq 0.97$.

8. The method as claimed in claim 5, wherein when the respective composition ratio of (Ge and/or Ag), (In and/or Ga), Sb and Te in terms of atomic % thereof are α, β, γ and δ, α, β, γ and δ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, $0.22 \leq \delta/(\alpha+\beta+\gamma+\delta) \leq 0.32$, $0.88 \leq (\gamma+\delta)/(\alpha+\beta+\gamma+\delta) \leq 0.97$ and $\alpha < \beta$.

9. The method as claimed in claim 5, wherein the respective composition ratio of (Ge and/or Ag), (In and/or Ga), Sb and Te in terms of atomic % thereof are α, β, γ and δ, α, β, γ and δ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, $0.22 \leq \delta/(\alpha+\beta+\gamma+\delta) \leq 0.32$, $0.88 \leq (\gamma+\delta)/(\alpha+\beta+\gamma+\delta) \leq 0.97$, and $\alpha < \beta$, and said phase-changeable recording material further comprises a GeTe crystal.

10. The method as claimed in claim 4, wherein said phase-changeable recording material comprises Ag, In, Sn and Te with the respective composition ratios thereof in terms of atomic % being α, β, γ and δ, and satisfying the conditions of:

$0 < \alpha \leq 10$, $2 \leq \beta \leq 12$, $55 \leq \gamma \leq 70$, $22 \leq \delta \leq 32$, and $\alpha+\beta+\gamma+\delta = 100$.

11. An information recording and reproducing apparatus for recording and reproducing information by a method of recording and reproducing information in a phase-change optical recording medium comprising a recording layer which comprises a phase-changeable recording material capable of being subjected to a phase-change by irradiation of an electromagnetic wave for recording, reproducing and/or rewriting information, wherein when information is recorded in said phase-change optical recording medium by modulating an input signal and conducting pulse width modulation recording, (A) a recording pulse string for recording and rewriting, corresponding to a zero (0) signal with signal width nT, in which n is a positive integer, and T is a clock unit time, after the modulation of said input signal, is a continuous electromagnetic wave with a power level e, and (B) a recording pulse string for recording and rewriting, corresponding to a one (1) signal with A signal width nT, in which n is a positive integer, and T is a clock unit time, after the modulation of said input signal, is an electromagnetic wave pulse string having:

a front-pulse portion fp with a power level a and a pulse duration period x, a multi-pulse portion mp comprising a low-level pulse with a power level b and a high-level pulse with a power level c, with a total pulse duration period T and a duty ratio y, alternately repeating (n–n') times continuously, and an off-pulse portion op with a power level d and a pulse duration period z, in which x, y and z respectively satisfy $0.5T \leq x \leq 2.0T$, $0.125 \leq y \leq 0.875$, and $0.125T \leq z \leq 1.0T$, n' is a positive integer which satisfies the condition of $n' \leq n$, and (a and c) $\geq$ e $\geq$ (b and d), wherein said duty ratio y is decreasing as a recording linear velocity for said phase-change optical recording medium is increased, whereby multi-speed recording or CAV (constant angular velocity) recording is carried out.

12. The information recording and reproducing apparatus as claimed in claim 11, wherein said recording linear velocity, when said duty ratio y is 0.5, is set in a range of more than $(V_H+V_L)/2$ to $V_H$ or less, that is, $(V_H+V_L)/2 <$ said recording linear velocity (when y=0.5) $\leq V_H$, wherein $V_H$ is a maximum recordable linear velocity and $V_L$ is a minimum recordable linear velocity.

13. The information recording and reproducing apparatus as claimed in claim 11, wherein said phase-changeable recording material comprises at least Sb and Te.

14. The information recording and reproducing apparatus as claimed in claim 11, wherein said phase-changeable recording material comprises (Ge and/or Ag), In, Sb and Te.

15. The information recording and reproducing apparatus as claimed in claim 11, wherein said phase-changeable recording material comprises (Ge and/or Ag), (In and/or Ga), Sb and Te.

16. The information recording and reproducing apparatus as claimed in claim 15, wherein when the respective composition ratios of (Ge and/or Ag), (In and/or Ga), Sb and Te in terms of atom % thereof are α, β, γ and δ, α, β, γ and δ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, and $0.22 \leq \delta/(\alpha+\beta+\gamma+\delta) \leq 0.32$.

17. The information recording and reproducing apparatus as claimed in claim 15, wherein when the respective composition ratios of (Ge and/or Ag), (In and/or Ga), Sb and Te in terms of atomic % thereof are α, β, γ and δ, α, β, γ and δ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, $0.22 \leq \delta/(\alpha+\beta+\gamma+\delta) \leq 0.32$, and $0.88 \leq (\gamma+\delta)/(\alpha+\beta+\gamma+\delta) \leq 0.97$.

18. The information recording and reproducing apparatus as claimed in claim 15, wherein when the respective composition ratios of (Ge and/or Ag), (In and/or Ga), Sb and Te in terms of atomic % thereof are $\alpha$, $\beta$, $\gamma$ and $\delta$, $\alpha$, $\beta$, $\gamma$ and $\delta$ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, $0.22 \leq \delta/(\alpha+\beta+\gamma+\delta) \leq 0.32$, $0.88 \leq (\gamma+\delta)/(\alpha+\beta+\gamma+\delta) \leq 0.97$, and $\alpha < \beta$.

19. The information recording and reproducing apparatus as claimed in claim 15, wherein when the respective composition ratios of (Ga and/or Ag), (In and/or Ga), Sb and Te in terms of atomic % thereof are $\alpha$, $\beta$, $\gamma$ and $\delta$, $\alpha$, $\beta$, $\gamma$ and $\delta$ satisfy the conditions of:

$0.001 \leq \alpha/(\alpha+\beta+\gamma+\delta) \leq 0.10$, $0.02 \leq \beta/(\alpha+\beta+\gamma+\delta) \leq 0.12$, $0.55 \leq \gamma/(\alpha+\beta+\gamma+\delta) \leq 0.70$, $0.22 \leq \delta/(\alpha+\beta+\gamma+\delta) \leq 0.32$, $0.88 \leq (\gamma+\delta)/(\alpha+\beta+\gamma+\delta) \leq 0.97$, and $\alpha < \beta$, and said phase-changeable recording material further comprises a GeTe crystal.

20. The information recording and reproducing apparatus as claimed in claim 14, wherein said phase-change recording material comprises Ag, In, Sn and Te with the respective composition ratios in terms of atomic % being $\alpha$, $\beta$, $\gamma$ and $\delta$ which satisfy the conditions of:

$0 < \alpha \leq 10$, $2 \leq \beta \leq 12$, $55 \leq \gamma \leq 70$, $22 \leq \delta \leq 32$, and $\alpha+\beta+\gamma+\delta=100$.

* * * * *

UNITED STATES PATENT AND TRADEMARK OFFICE
CERTIFICATE OF CORRECTION

PATENT NO.   : 6,757,232 B2
DATED        : June 29, 2004
INVENTOR(S)  : Katsuyuki Yamada, Yuki Nakamura and Masaki Kato It is certified that error appears in the above-identified patent and that said Letters Patent is hereby corrected as shown below:

<u>Column 12,</u>
Line 45, change "$0.5T \leqq y \leqq 2.0T$" to -- $0.5T \leqq x \leqq 2.0T$ --

Signed and Sealed this

Twenty-ninth Day of March, 2005

JON W. DUDAS
*Director of the United States Patent and Trademark Office*